(No Model.)

J. F. BLACK.
BICYCLE CONSTRUCTION.

No. 589,240. Patented Aug. 31, 1897.

Witnesses
Inventor
J. F. Black

UNITED STATES PATENT OFFICE.

JOHN FERGUSON BLACK, OF MONTREAL, CANADA, ASSIGNOR OF ONE-HALF TO ALFRED MARTIN SMITH, OF SAME PLACE.

BICYCLE CONSTRUCTION.

SPECIFICATION forming part of Letters Patent No. 589,240, dated August 31, 1897.

Application filed November 30, 1896. Serial No. 613,881. (No model.)

*To all whom it may concern:*

Be it known that I, JOHN FERGUSON BLACK, manufacturer, of the city of Montreal, in the county of Hochelaga, in the Province of Quebec, Canada, have invented certain new and useful Improvements in Bicycle Construction, of which the following is a specification.

My invention relates to improvements in the construction of bicycles and other similar machines, and more particularly in connection with the crank-hanger and driving mechanism of this class of machine; and the object is to provide a strong construction of frame, whereby the crank-hanger will be held rigidly should a heavy strain be brought upon it through the pedal-crank, and also in connection therewith to devise a form of drive which will readily give a high gearing and at the same time a most efficient application of the power; and it consists of the detail arrangement and construction, as will be hereinafter described, and particularly pointed out in the claims.

Figure 1:
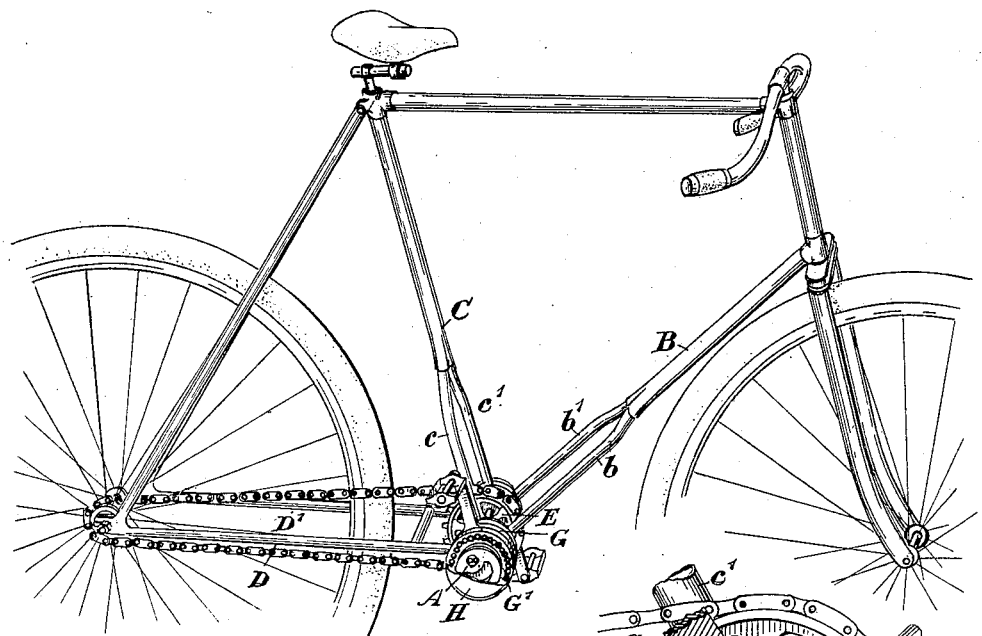
Figure 3:
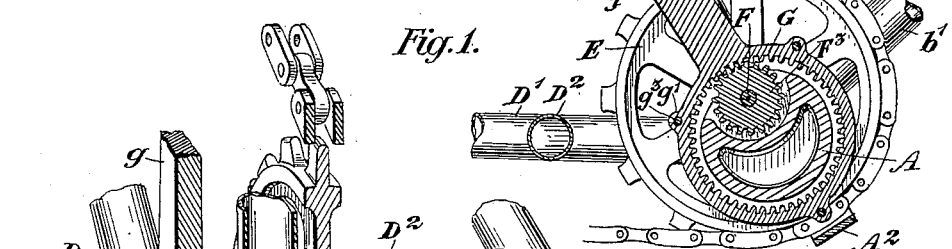
Figure 2:
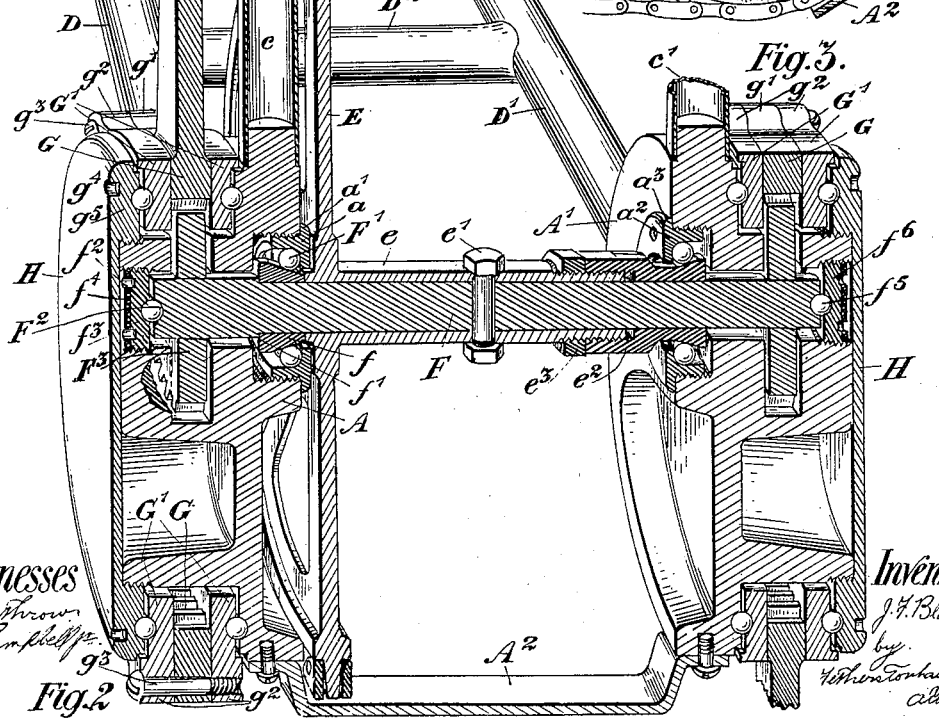

Figure 1 is a perspective view, partly broken away, of a bicycle constructed in accordance with my invention. Fig. 2 is an enlarged cross-sectional perspective detail of crank-hangers, through the rear forked standard or post, axle of sprocket-wheel, and axis of internal gear, looking toward the rear of the bicycle. Fig. 3 is a longitudinal sectional elevation through one of the crank-arms, internal gear-wheel, and pinion-wheel.

In the drawings like letters of reference indicate corresponding parts in each figure.

A and A' are irregular disk-shaped crank-hangers, around the periphery of which are suitably attached the members $b$ and $b'$ of the fork of the lower reach B, and the members $c$ and $c'$ of the forked lower end of the post C and the lower rear side bars D and D'. The side bars D and D' are preferably rigidly connected together between the crank-hangers and the periphery of the rear wheel by the cross-bar $D^2$, and the crank-hangers A and A' are rigidly connected at the bottom by the cross-bar $A^2$. (See Fig. 2.)

The sprocket-wheel E is made integral with or is attached to the end of the sleeve $e$, which is firmly attached to the axle F by the bolt $e'$.

The axle F is adjustably journaled in the crank-hanger A in the following manner: The bearing-cone $f$ is firmly held on the axle F between the end of the sleeve $e$ and the shoulder $f'$, formed on the axle. The bearing-cup $a$, having an external shoulder-flange $a'$, is firmly screwed or otherwise fixed in the crank-hanger A. The usual ring of balls F' is placed between the cup $a$ and the cone $f$.

In the cup $F^2$ in the center of the end of the axle F is placed the single ball $f^2$, which journals in a corresponding cup situated centrally in the end of the screw-plug $f^3$, which after being screwed up to give the proper adjustment to the bearing is locked in position by the locking-plug $f^4$.

The axle F is adjustably journaled in the crank-hanger A' in the following manner: The bearing-cup $a^2$, having the external shoulder $a^3$, is firmly screwed into the crank-hanger A', and the bearing-cone $e^2$ is adjustably screwed onto the end of the sleeve $e$ far enough to bring the balls in the cup $a^2$ into proper adjustment, where the cone is locked by the lock-nut $e^3$. The ball $f^5$ is inserted in the cups centered in the ends of the axle F and the plug $f^6$, and the plug is adjusted and locked in the same manner as the plug $f^3$.

Near each end of the axle F, between the cup and end bearings, are firmly attached the pinion-wheels $F^3$, which coact with the internal gear-wheels G, to which are attached or formed integrally therewith the pedal-cranks $g$.

The internal gear-wheels G are journaled on the crank-hangers eccentrically to the axle of the sprocket-wheel, as follows: The internal gear-ring G has lugs $g'$ formed up at desired distances apart around its periphery. G' are annular rings situated one on each side of the internal gear-rings G, and have similar lugs $g^2$, by which the rings G and G' are firmly bound together by the screw-bolts $g^3$. In the outer faces of the rings G' are cut concentrically with the pitch-circle of the internal gear-rings, the grooves $g^4$. In the outer faces of the crank-hangers A and A' and in the inner faces of the screw-caps H are cut similar grooves, so that when the balls $g^5$ are inserted and the caps H are screwed onto the crank-hangers sufficiently far to properly adjust the bearings the rings G', with the internal gear-rings G and crank-arms g, will revolve freely on the balls $g^5$, the internal teeth meshing with the teeth of the pinions F' and driving the sprocket-wheel E at a rate faster than the revolution of the crank, in proportion to the number of teeth on the internal gear to the number of teeth on the pinion.

From the sprocket-wheel the rear wheel of the bicycle is driven in the ordinary manner.

It will also be seen that, as in my form of construction the sprocket-axle bearings in each crank-hanger are independent of the other, and the outward thrust of the cups $a$ and $a^2$ upon the cones $f$ and $f^2$ is neutralized in each crank-hanger by the inward thrust of the end plug-bearings. Thus not only is there no thrust or pull exerted upon the crank-hangers by the sprocket-axle bearings, tending to separate them or to draw them together, but this form of bearing actually holds them firmly against lateral movement. With the further aid of the forks and the cross-bars $A^2$ and $D^2$, I have a very firm form of crank-hanger. The pinions $F^3$ also come between their axle-bearings, which gives greater strength than in other forms, where they are placed outside their bearings. The same remark holds good relative to the internal gear-wheels and pedal-cranks. They are situated between their bearings, which are also very large and correspondingly strong.

The sprocket-wheel, which is placed as close to the side as possible, will be seen on reference to Fig. 2 to lie close along the inside of the tubes $b$, $c$, and D. This just gives the chain, if such is used, good clearance along the side of the tire of the rear wheel, but keeps it inside all tubing and out of the way of trousers and skirts. This form of construction consequently allows of the easy application of a skirt or mud guard, it being merely necessary to stretch a netting or other guard between the lower part of the forks of the rear post, the lower side bars, and the lower part of the rear upright bars.

In my form of construction the lower side bars are made straight, and consequently stronger than when bent or cranked, as is done when used with the ordinary form of single crank-hanger.

It will be noticed that in forming the rings G', I leave small lips extending outwardly from the faces horizontally at the periphery, which overlap but do not touch the periphery of the caps H and the crank-hangers A and A', where small grooves are formed at the edges. This is done to make the bearings dust-proof, and thus it will be seen that all the bearings and gearing are internal and dust-proof.

What I claim is—

1. In combination the sprocket-wheel axle, the crank-hangers, the sprocket-wheel provided with a sleeve secured to the sprocket-wheel axle, the interior threaded recesses in the crank-hangers, the cups with shoulder-flanges screwed into the recesses, the balls and the cones secured to the axle, said crank-hangers having threaded openings in the outer faces thereof in alinement with said axle, the plugs adjustable in said openings and the balls interposed between said plugs and the ends of the axle, all arranged as and for the purpose specified.

2. In combination, the sprocket-wheel axle, the crank-hangers, the sprocket-wheel provided with a sleeve secured to the sprocket-wheel axle, the interior threaded annular recess in one crank-hanger next the sprocket-wheel, the cup with shoulder-flange screwed into the same, the balls, the shoulder on the sprocket-wheel axle, the cone extending between such shoulder and the hub of the sprocket-wheel, the interior threaded recess in the opposite crank-hanger, the cup with shoulder-flange, the balls, the cone with threaded cup-shaped end screwed onto the end of the sleeve of the sprocket-wheel and the lock-nut on the threaded end of such sleeve, as and for the purpose specified.

3. In combination, the crank-hangers, the sprocket-wheel axle and sprocket-wheel, the bearings for the sprocket-wheel axle at the interior of the crank-hangers, the caps secured to the opposite ends of the crank-hangers and the single ball-bearing at each end of the sprocket-wheel axle, comprising a threaded plug fitted into a corresponding recess in each crank-hanger and a ball fitting in a recess in the end of the axle, as and for the purpose specified.

4. In combination, the sprocket-wheel axle, the crank-hangers and bearings in the same forming a support for each end thereof, the sprocket-wheel, the pinions on the ends of the sprocket-wheel axle, the gear-rings with cranks attached to or forming part of the same, the supplemental rings secured to the gear-rings by suitable lugs and bolts, the ball-bearings between the inner supplemental rings and the crank-hangers, the removable caps screwed onto the threaded outer end of each crank-hanger, and the ball-bearings between the removable caps and the outer supplemental rings, as and for the purpose specified.

5. In combination the disk-hangers, the axle journaled therein, the integral crank and eccentrically-journaled internal gear, the pinion on the axle meshing with said gear, the independent ring secured to each side of said gear, the cap and ball-bearings interposed between the cap and the opposing ring, and the disk and the ring opposite thereto, substantially as described.

JOHN FERGUSON BLACK.

Witnesses:
W. J. WITHROW,
R. A. SMITH.